US008374776B2

(12) United States Patent
Spencer, V

(10) Patent No.: US 8,374,776 B2
(45) Date of Patent: Feb. 12, 2013

(54) METHODS AND APPARATUS FOR INDICATING A RELATIVE ALTITUDE IN ONE OR MORE DIRECTIONS

(75) Inventor: William F. Spencer, V, Dana Point, CA (US)

(73) Assignee: The Boeing Company, Chicago, IL (US)

( * ) Notice: Subject to any disclaimer, the term of this patent is extended or adjusted under 35 U.S.C. 154(b) by 284 days.

(21) Appl. No.: 12/751,144

(22) Filed: Mar. 31, 2010

(65) Prior Publication Data

US 2011/0246065 A1 Oct. 6, 2011

(51) Int. Cl.
*G01C 21/00* (2006.01)
(52) U.S. Cl. ........................................................ 701/408
(58) Field of Classification Search .................. 701/408, 701/412
See application file for complete search history.

(56) References Cited

U.S. PATENT DOCUMENTS

| | | | | |
|---|---|---|---|---|
| 5,638,282 | A | 6/1997 | Chazelle et al. | |
| 6,133,867 | A * | 10/2000 | Eberwine et al. | 342/29 |
| 6,289,277 | B1 | 9/2001 | Feyereisen et al. | |
| 6,538,581 | B2 * | 3/2003 | Cowie | 340/961 |
| 6,653,947 | B2 * | 11/2003 | Dwyer et al. | 340/970 |
| 6,985,091 | B2 | 1/2006 | Price | |
| 2002/0143439 | A1 | 10/2002 | Morizet et al. | |
| 2003/0193411 | A1 * | 10/2003 | Price | 340/973 |
| 2004/0160341 | A1 * | 8/2004 | Feyereisen et al. | 340/970 |
| 2004/0222916 | A1 * | 11/2004 | Smith et al. | 342/29 |
| 2007/0174005 | A1 * | 7/2007 | Bitar et al. | 701/211 |
| 2009/0326741 | A1 | 12/2009 | Marty et al. | |
| 2010/0082186 | A1 * | 4/2010 | Burgin et al. | 701/9 |
| 2010/0274486 | A1 * | 10/2010 | Lorido et al. | 701/301 |

FOREIGN PATENT DOCUMENTS

| | | | |
|---|---|---|---|
| EP | 2204639 | A1 | 7/2010 |
| WO | 0031564 | A1 | 6/2000 |
| WO | 03071371 | A1 | 8/2003 |

OTHER PUBLICATIONS

Pschierer, C. et al; Human Factors Evaluation of a Dynamic Channel Depiction of Navigation Procedures in SVS Displays; Enhanced and Synthetic Vision; Proceedings vol. 6559; Apr. 27, 2007;13 pages.
U.S. Appl. No. 12/706,852, filed Feb. 17, 2010.
Combined Search and Examination Report of GB1105124.0; Jul. 15, 2007; 7 pages.
Partial European Search Report of EP11154880.6-2215 dated Jul. 4, 2011; 6 pages.

* cited by examiner

*Primary Examiner* — Mary Cheung
*Assistant Examiner* — Truc M Do
(74) *Attorney, Agent, or Firm* — Armstrong Teasdale LLP

(57) ABSTRACT

A method for indicating a relative altitude of a vehicle includes obtaining, from at least one navigation instrument, a current geographic position and a current altitude of the vehicle. One or more geographic areas substantially surrounding the current geographic position is defined. A minimum safe altitude (MSA) is determined for each geographic area based at least in part on a minimum clearance height and a maximum terrain elevation or a maximum obstruction elevation within the geographic area. A relative altitude representing the current altitude of the vehicle relative to the MSA for each geographic area is determined. A relative altitude indicator is displayed via a presentation device for each geographic area based at least in part on the corresponding relative altitude. A relative altitude indicator corresponding to an MSA below the current altitude is graphically distinguished from a relative altitude indicator corresponding to an MSA above the current altitude.

19 Claims, 7 Drawing Sheets

100
105
110
COMPUTING DEVICE
Presentation Device
125
User Input Device
130
Processor
115
Memory
120
Comm. Interface
140
Instrument Interface
145
Database
135
Navigation Instrument
150
151
Navigation Instrument
150
152
Environmental Instrument
155
Vehicle Instrument
160

METHODS AND APPARATUS FOR INDICATING A RELATIVE ALTITUDE IN ONE OR MORE DIRECTIONS

BACKGROUND

The field of the disclosure relates generally to displaying a condition of a vehicle and, more specifically, to methods and apparatus for indicating an altitude of a vehicle relative to nearby terrain or obstructions.

Navigation charts, whether physical or electronic, are used to plan and track aircraft flights. Some navigations charts include recommended altitude information for predefined routes, such as airways or routes of departure from airports. Furthermore, moving maps are used to depict an aircraft's current position and may include topographical information, such as terrain elevation. Some moving maps color code features within the map based on an altitude of the features relative to an altitude of the aircraft.

Such charts and maps are useful for planning and plotting air travel. However, in an emergency situation, such as a mechanical failure or a load shift, existing systems require an operator to interpret a relatively large amount of information in order to determine a safe altitude or a safe direction of travel, while also addressing the cause of the emergency in a stressful environment. Furthermore, if the emergency occurs off a planned route, the operator may have relatively little information readily available. The operator may therefore spend valuable time collecting and interpreting information or arrive at an incorrect result, presenting a risk of flight into terrain. Accordingly, a need exists for a continuously updated indication of relative altitude in potential directions of travel.

BRIEF SUMMARY

In one aspect, a method for indicating a relative altitude of a vehicle is provided. The method includes obtaining, from at least one navigation instrument, a current geographic position and a current altitude of the vehicle. One or more geographic areas substantially surrounding the current geographic position is defined by a processor. A minimum safe altitude (MSA) for each geographic area of the one or more geographic areas is determined by the processor based at least in part on a minimum clearance height and at least one of the following: a maximum terrain elevation within the geographic area, and a maximum obstruction elevation within the geographic area. A relative altitude for each geographic area of the one or more geographic areas is determined by the processor. The relative altitude represents the current altitude of the vehicle relative to the MSA for the geographic area. A relative altitude indicator is displayed via a presentation device for each geographic area of the one or more geographic areas based at least in part on the corresponding relative altitude, wherein a relative altitude indicator corresponding to an MSA below the current altitude is graphically distinguished from a relative altitude indicator corresponding to an MSA above the current altitude.

In another aspect, a system for indicating a condition of a vehicle is provided. The system includes at least one navigation instrument, a computing device, and a presentation device. The at least one navigation instrument is configured to provide a current geographic position and a current altitude of the vehicle. The computing device is coupled in communication with the at least one navigation instrument and configured to define a plurality of geographic areas substantially adjacent to the current geographic position. Each of the geographic areas corresponds to a plurality of terrain points. The computing device is also configured to determine a minimum safe altitude (MSA) for each geographic area of the plurality of geographic areas based at least in part on a maximum elevation of the corresponding terrain points and a minimum clearance height. The computing device is further configured to assign a threat level to each geographic area of the plurality of geographic areas based at least in part on the MSA and the current altitude. The presentation device is coupled in communication with the processor and configured to display a graphical representation of the threat level assigned to each geographic area.

In yet another aspect, a device for indicating a relative altitude of a vehicle is provided. The device includes an instrument interface configured to receive a current geographic position and a current altitude from at least one navigation instrument. The device also includes a processor coupled in communication with the instrument interface and programmed to define a plurality of geographic areas proximate to the vehicle based at least in part on the current geographic position. The plurality of geographic areas includes a plurality of contiguous sectors approximately within a radial distance of the vehicle and corresponding to a plurality of terrain points. The processor is also programmed to determine a minimum safe altitude (MSA) for each geographic area of the plurality of geographic areas based at least in part on a maximum elevation of the corresponding terrain points and a minimum clearance height. The processor is further programmed to assign a threat level to each geographic area of the plurality of geographic areas based at least in part on the MSA and the current altitude. The device also includes a presentation device coupled in communication with the processor and configured to display a graphical representation of each geographic area of the plurality of geographic areas based on the threat level assigned to the geographic area.

The features, functions, and advantages that have been discussed can be achieved independently in various embodiments of the invention or may be combined in yet other embodiments, further details of which can be seen with reference to the following description and drawings.

DETAILED DESCRIPTION

Figure 1:
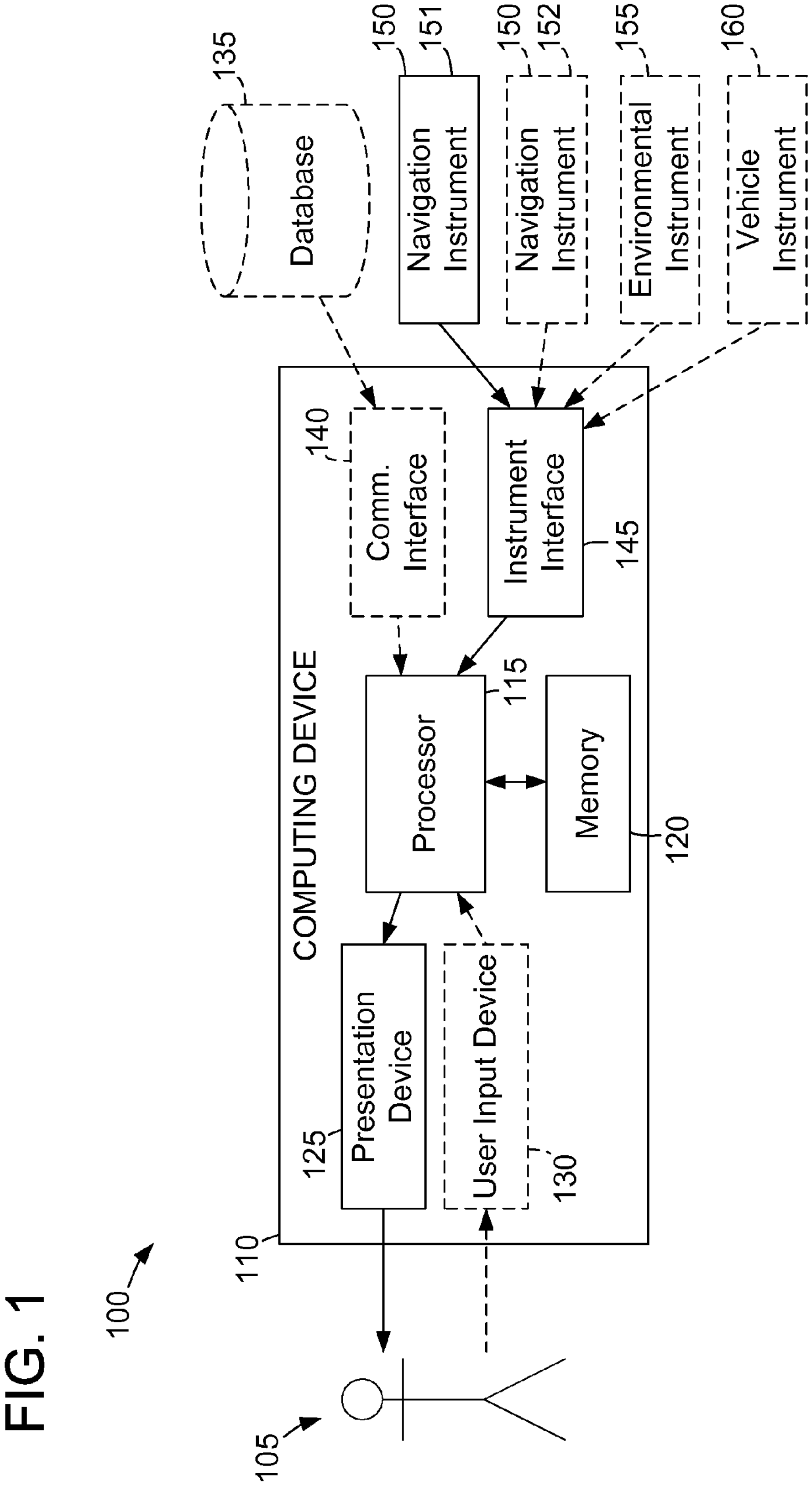
FIG. 1 is a block diagram illustrating a system for displaying a relative altitude of a vehicle in one embodiment of the invention.

In various embodiments, an apparatus and method for displaying a relative altitude indicator are provided. As described herein, a relative altitude is a vertical displacement between a vehicle and surrounding terrain, surrounding obstructions, or surrounding terrain and obstructions. A relative altitude for a point of terrain may be determined by, for example, subtracting an elevation of the terrain point above sea level from the true altitude of the vehicle (i.e., the elevation of the vehicle above sea level). Furthermore, if an obstruction, such as a man-made structure, is present at the terrain point, the height of the obstruction may be added to the elevation of the terrain point to determine an elevation of the obstruction. The elevation of the obstruction may be subtracted from the true altitude of the vehicle to calculate the relative altitude.

Furthermore, some embodiments facilitate determining a threat level of a geographic area based on a relative altitude for the geographic area and a minimum clearance height (MCH). For example, an MCH may be used to encourage an operator to maintain a safe buffer of vertical displacement between a vehicle and underlying terrain. Otherwise, without an MCH buffer, a sudden decrease in altitude, even if slight, may result in contact between the vehicle and the terrain. Accordingly, a geographic area may be considered to present a risk to the vehicle if the altitude of the vehicle relative to the geographic area is less than the MCH. Exemplary minimum clearance heights include 2000 feet, 1000 feet, 500 feet, and 250 feet, though any value suitable for use with the methods described herein is contemplated. For example, an MCH of 0 may be suitable for some operations, such as helicopter hovering. The MCH may be a fixed value, selected by an operator, or calculated based on a state of the vehicle, such as forward or vertical speed. MCH may be a constant or may vary, such as with the radial distance from the vehicle. An MCH may be added to the elevation of a terrain point to calculate a minimum safe altitude (MSA) for the terrain point or for a geographic area encompassing the terrain point. Furthermore, the result of adding the MCH to the elevation may be rounded (e.g., to a multiple of 10 feet, 50 feet, or 100 feet) to determine the MSA. Rounding may be based on the magnitude of the MCH. For example, the MSA may be rounded to a multiple of 100 feet for an MCH greater than or equal to 300 feet, and rounded to a multiple of 50 feet for an MCH less than 300 feet.

Embodiments are described herein with respect to aircraft, which include, but are not limited to, fixed wing and rotary wing aircraft operating near Earth's surface. However, such embodiments are practicable with any vehicle that is operated at a vertical displacement from some form of terrain or obstruction. For example, methods described herein may be used in a submarine or a submersible, for which the terrain may include a seafloor, or an extraplanetary vehicle, for which the terrain may include a surface of a remote body, such as the moon or a planet other than Earth. In the context of sub-sea-level travel, depths may be expressed as negative values of elevation. Vehicles may be piloted (manned), or may be unmanned, such as remotely-piloted vehicles. For unmanned vehicles, an MSA indicator may be displayed to a remote pilot, or its values may be used logically or automatically, such as in software controlling the vehicle.

Furthermore, embodiments described herein may be used to indicate a vertical displacement of a vehicle with respect to terrain either below or above the vehicle. For example, operation of a submersible within a cave system may benefit from display of vertical displacement from both a floor and a ceiling of the surrounding terrain. For such applications, the embodiments may be modified, such as by calculating a maximum safe altitude as opposed to a minimum safe altitude.

Besides emergency use, the embodiments described herein may facilitate an operator of the vehicle to validate regular operation of the vehicle in accordance with applicable laws, rules, desires, or combination thereof, such as the maintenance of a 2000 foot vertical buffer above all terrain within 5 nautical miles laterally or for low-level flight under instrument flight rules.

Embodiments described herein facilitate the dynamic composition and display of a relative altitude indicator depicting a relative altitude of a vehicle in potential directions of travel. Such a relative altitude indicator may enable an operator of the vehicle to instantly determine a safe direction of travel in an emergency situation.

FIG. 1 is a block diagram illustrating a system 100 for displaying a relative altitude of a vehicle. System 100 may be used, for example, by a user 105, such as a pilot or other vehicle operator. System 100 includes a computing device 110. Computing device 110 includes a processor 115 for executing instructions. In some embodiments, executable instructions are stored in a memory area 120. Computing device 110 is configurable to perform the operations described herein by programming processor 115. For example, processor 115 may be programmed by encoding an operation as one or more executable instructions and providing the executable instructions in memory area 120. Processor 115 may include one or more processing units (e.g., in a multi-core configuration). Memory area 120 is any device allowing information such as executable instructions and other data to be stored and retrieved. Memory area 120 may include one or more computer readable media.

Computing device 110 also includes at least one presentation device 125 for presenting information, such as a navigation chart, to user 105. In some embodiments, presentation device 125 includes a display adapter (not shown in FIG. 1), which is operatively coupled to processor 115 and operatively couplable to a display device, such as a cathode ray tube (CRT), a liquid crystal display (LCD), an organic light emitting diode (OLED) display, an "electronic ink" display, or any combination thereof.

In some embodiments, computing device 110 includes user input device 130 for receiving input from user 105. User input device 130 may include, for example, functionally defined switches or buttons, a keyboard, a pointing device, a mouse, a stylus, a touch sensitive panel (e.g., a touch pad or a touch screen), a gyroscope, an accelerometer, a position detector, an audio input device, or any combination thereof. A single component such as a touch screen may function as both presentation device 125 and user input device 130.

Stored in memory area 120 are, for example, computer readable instructions for providing a user interface to user 105 via presentation device 125 and, optionally, receiving and processing input from input device 130. A user interface may include, among other possibilities, a real-time navigation application.

In some embodiments, memory area 120 is configured to store terrain data (e.g., including obstruction data), vehicle data, flight data, or any combination thereof. For example, memory area 120 may be configured to store one or more topographical maps, vehicle attributes, route information, or any combination thereof. In addition, or alternatively, terrain data, vehicle data, flight data, or any combination thereof, may be stored in a database 135, accessible to computing device 110 via a communication interface 140, which is communicatively coupled to processor 115.

Vehicle attributes may include, but are not limited to, a vehicle type (e.g., a fixed wing aircraft), a vehicle capability (e.g., directions of travel, a climb capability, or an operating envelope), a load weight, or any combination thereof. An operating envelope may include, for example, a maximum load factor for one or more directions (e.g., positive vertical acceleration and negative vertical acceleration) at one or more velocities.

In an exemplary embodiment, a topographical map includes a plurality of points, each of which corresponds to a geographic position, a geographic area, or a combination thereof. For example, each point may correspond to a geographic area approximately 100 meters square, approximately 30 meters square, or approximately 10 meters square, although other spatial resolutions are contemplated.

Computing device 110 also includes an instrument interface 145, which is configured to be coupled in communication with one or more navigation instruments 150. In the exemplary embodiment, a first navigation instrument 151 and a second navigation instrument 152 are included. Navigation instrument 150 may include, for example, a global positioning system (GPS) receiver, an inertial navigation system, a radio navigation system, an altimeter, any other device suitable for providing navigation data, or any combination thereof. Navigation instrument 150 is configured to provide a current geographic position, a current heading (e.g., a direction of travel), a current speed (e.g., a ground speed or an air speed), a vertical velocity, a vertical acceleration, a current altitude, or any combination thereof. For example, navigation instrument 150 may be configured to provide navigation data continuously, periodically, upon request, or upon a change in a geographic position, a heading orientation, or a combination thereof, though other timings are also contemplated. Navigation instrument 150 may provide a geographic position by providing absolute geographic coordinates (e.g., a latitude and a longitude), a position (e.g., direction or distance) relative to a terrain point, any other suitable means of expressing a geographic position, or any combination thereof. Navigation instrument 150 may provide a heading by providing a rotational displacement from true north or magnetic north (e.g., expressed in degrees), a cardinal direction, a direction relative to a terrain point, any other suitable means of expressing a heading, or any combination thereof.

Instrument interface 145 may also be coupled in communication with one or more environmental instruments 155, vehicle instruments 160, or a combination thereof. Environmental instrument 155 is configured to indicate one or more environmental conditions, such as, but not limited to, an ambient fluid (e.g., air or water) temperature, an ambient fluid density, a wind direction, a wind speed, or an ambient humidity level. Vehicle instrument 160 is configured to indicate a vehicle condition, such as, without limitation, a gross weight, an engine condition (e.g., a quantity of operating engines), an available thrust, a current thrust, a current throttle level, a flap position, a landing gear position, or any combination thereof.

A vehicle may include one or more portions of system 100. For example, system 100 may be entirely contained in a manned vehicle. Alternatively, an unmanned vehicle may include only navigation instrument 150, environmental instrument 155, vehicle instrument 160, or any combination thereof, and computing device 110 may be positioned at a location remote to the unmanned vehicle. Such an embodiment facilitates indication of relative altitude to a remote operator of a vehicle in an unmanned vehicle system.

In an exemplary embodiment, processor 115 is programmed to define a plurality of geographic areas substantially adjacent to or proximate to a current geographic position indicated by navigation instrument 150. Each of the geographic areas corresponds to a plurality of terrain points (e.g., within a topographical map). For example, the geographic areas may include a plurality of contiguous sectors (e.g., within a radial distance of the vehicle).

Processor 115 is also programmed to determine a minimum safe altitude (MSA) for each geographic area based at least in part on a maximum elevation of the corresponding terrain points and a minimum clearance height (MCH). Processor 115 is further programmed to assign a threat level to each geographic area based at least in part on the MSA and the current altitude indicated by navigation instrument 150. Presentation device 125 is configured to display a graphical representation of each geographic area based on the threat level assigned to the geographic area.

Computing device 110 may be configured to produce a "live" or repeatedly updated relative altitude indicator. For example, processor 115 may be programmed to repeatedly perform the operations described above. In such an embodiment, as the vehicle travels, the relative altitude indicator is redisplayed to reflect changes in the surrounding terrain, changes in the true altitude of the vehicle, or a combination thereof.

In some embodiments, user input device 130 is configured to accept one or more input parameters from user 105. For example, user input device 130 may receive from user 105 a selection of a minimum clearance height, a selection of a size, a shape, or a scale of one or more geographic areas, or any combination thereof.

Figure 2:
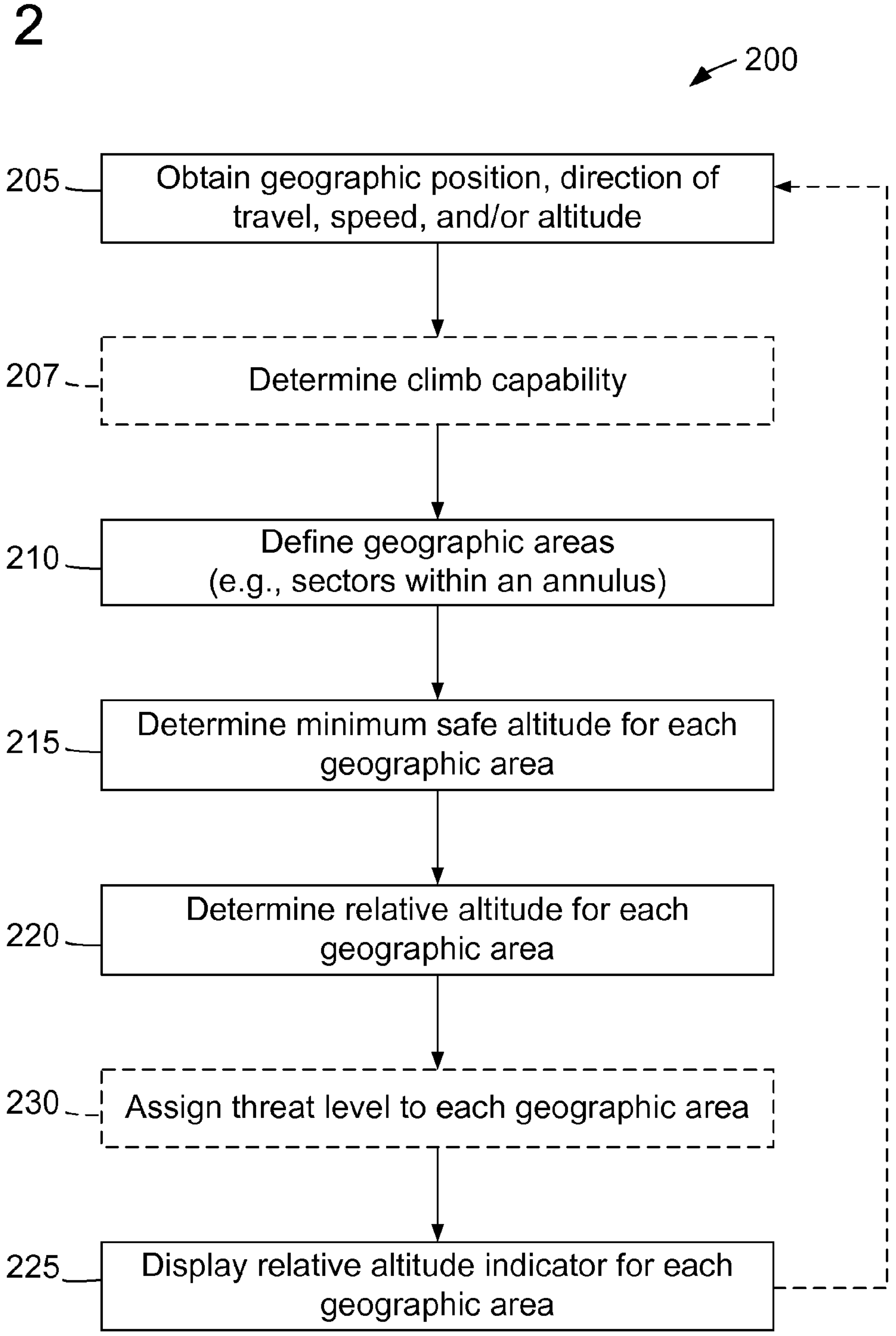
FIG. 2 is a flowchart illustrating an exemplary method for displaying a relative altitude of a vehicle.

FIG. 2 is a flowchart illustrating an exemplary method 200 for displaying a relative altitude of a vehicle. Method 200 is described below with reference to FIGS. 3-8.

Method 200 includes obtaining 205, from at least one navigation instrument (e.g., navigation instrument 150), a current geographic position and a current altitude of the vehicle. A plurality of geographic areas substantially surrounding the current geographic position is defined 210 by a processor, such as processor 115 of computing device 110.

Figure 3:
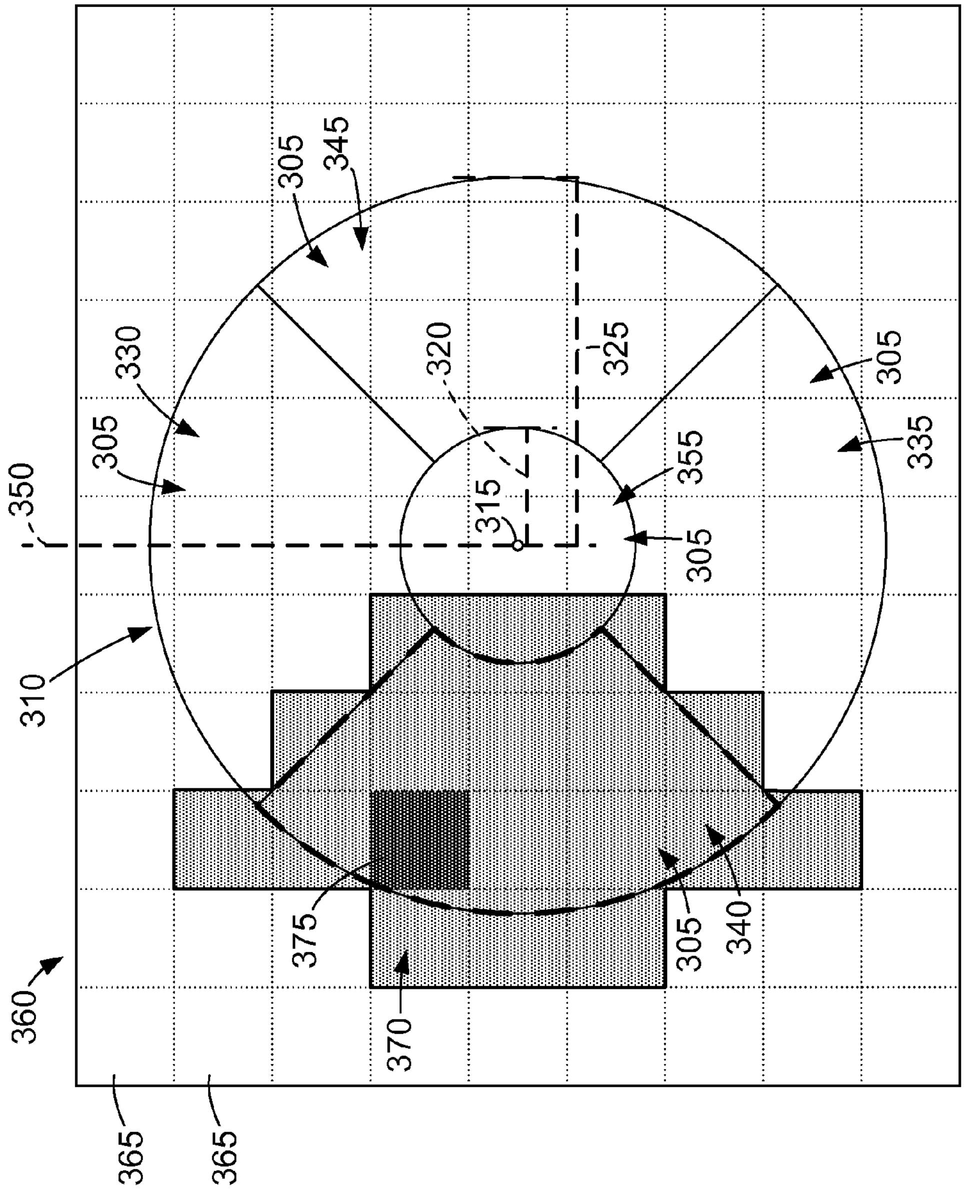
FIG. 3 is an illustration of a plurality of geographic areas substantially surrounding a geographic position of a vehicle.

FIG. 3 is an illustration of a plurality of geographic areas 305 substantially surrounding a geographic position of a vehicle. In the example of FIG. 3, geographic areas 305 are defined, at least in part, as contiguous sectors of an annulus 310 having a center 315 approximately at the current geographic position of the vehicle. Annulus 310 has an inner radius 320 (e.g., ⅓ nautical mile (nmi)) and an outer radius 325 (e.g., 5 nmi). In some embodiments, the size of one or more geographic areas 305 may be determined based at least in part on a speed of the vehicle. For example, geographic areas 305 may be defined, at least in part, as being within a radial distance of the vehicle. The radial distance may be defined as varying directly with the current speed.

In an exemplary embodiment, the contiguous sectors define a forward geographic area 330, a rear geographic area 335, a left-hand geographic area 340, and a right-hand geographic area 345, each of which represents a 90-degree segment of annulus 310. A center line 350 extends at 0 degrees from center 315. In an exemplary embodiment, center line 350 defines a direction of travel or a heading of the vehicle. For example, a current direction of travel may be received from a navigation instrument, and geographic areas 305 may be defined 210 based on the direction of travel. Forward geographic area 330 extends from center 315 at 315 degrees to 45 degrees and represents an area in the direction of travel. Right-hand geographic area 345 extends from center 315 at 45 degrees to 135 degrees, representing an area to the right of the direction of travel. Rear geographic area 335 extends from center 315 at 135 degrees to 225 degrees, representing an area behind the direction of travel. Left-hand geographic area 340 extends from center 315 at 225 degrees to 315 degrees, representing an area to the left of the direction of travel. In some embodiments, rear geographic area 335 is omitted. For example, in a vehicle capable of movement only in a forward direction, such as a conventional airplane, rear geographic area 335 may be considered irrelevant to an operator.

Geographic areas 305 may also include a center geographic area 355 substantially about the current geographic position. In FIG. 3, center geographic area 355 is shown as a circle having a radius equal to inner radius 320 of annulus 310. However, center geographic area 355 may be an ellipse, a rectangle, an ogive (i.e., a bullet shape), or any shape suitable for use with the methods described herein.

Geographic areas 305 are overlaid on a map 360, which includes a plurality of terrain points 365, depicted as grid squares. For example, map 360 may be a topographical map provided by database 135, memory area 120, or a combination thereof. In an exemplary embodiment, each terrain point 365 is associated with a terrain elevation and, optionally, an obstruction height, an obstruction elevation, or a combination thereof. For example, terrain point 365 may be associated with a terrain elevation of 325 feet. If a radio tower at terrain point 365 measures 50 feet high, terrain point 365 may also be associated with an obstruction height of 50 feet, an obstruction elevation of 375 feet (calculated by adding the terrain elevation to the obstruction height), or both.

A minimum safe altitude (MSA) for each geographic area 305 is determined 215 by the processor. The MSA for a geographic area 305 is based at least in part on a minimum clearance height (MCH) and a maximum terrain elevation within geographic area 305, a maximum obstruction elevation within geographic area 305, or a combination thereof. For example, for left-hand geographic area 340, terrain points 370 (shaded in FIG. 3) that lie within (e.g., entirely within, substantially within, or at least partially within) left-hand geographic area 340 may be identified. An effective elevation, equal to the associated terrain elevation plus the associated obstruction height, if any, is determined for each of terrain points 370. A maximum effective elevation among terrain points 370 is determined. In FIG. 3, highest terrain point 375 is associated with the maximum effective elevation within left-hand geographic area 340. The minimum clearance height is added to the maximum effective elevation (i.e., the effective elevation of highest terrain point 375) to determine 215 the MSA. In addition, the MSA may be rounded to a nearest or next greater multiple of 25 feet, 50 feet, 100 feet, or any other suitable value. The method described above may be used to determine 215 an MSA for any geographic area 305.

In some embodiments, an MSA is determined 215 based further on a climb capability of the vehicle. For example, a climb capability may be determined 207 based at least in part on one or more vehicle attributes (e.g., an operating envelope or a load weight), one or more vehicle conditions (e.g., a current air speed, a current ground speed, a gross weight, an engine condition, an available thrust, or a flap position), one or more environmental conditions, (e.g., an ambient air temperature or an ambient air density), or any combination thereof. A climb capability may be expressed, for example, as a vertical displacement over time (e.g., feet per second), as a vertical displacement over a horizontal displacement (e.g., vertical feet per horizontal feet), as an angle of displacement relative to level travel, in any other form suitable for indicating an ability of the vehicle to achieve a vertical displacement, or any combination thereof. In one embodiment, the MCH is adjusted to vary inversely with the climb capability. Such an embodiment facilitates ensuring a higher MSA is calculated for a vehicle with a relatively low climb capability.

A relative altitude for each geographic area is determined 220 by the processor. The relative altitude represents the current altitude of the vehicle relative to the MSA for the geographic area. For example, the relative altitude for a geographic area may be calculated by subtracting the MSA for the geographic area from the current altitude of the vehicle.

Figure 4:
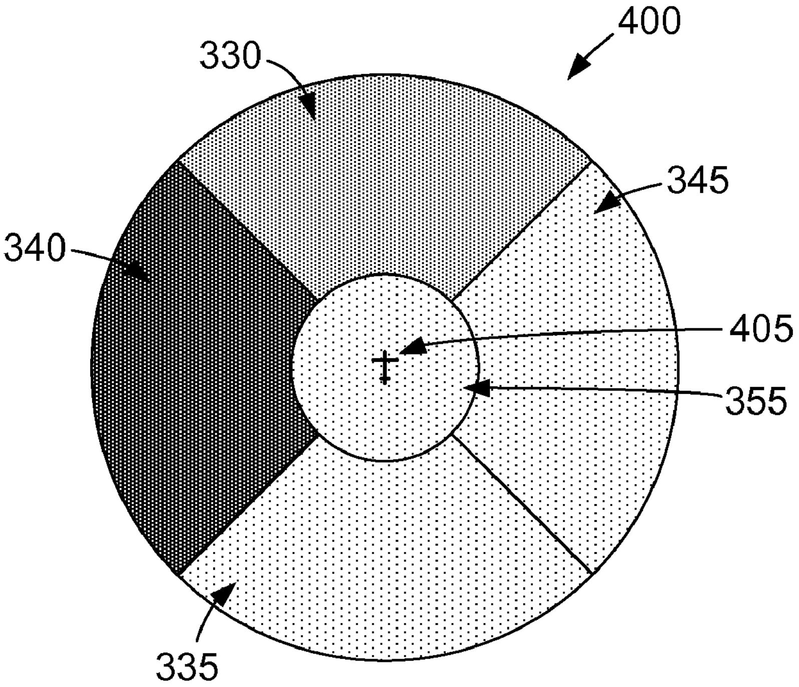
FIG. 4 is an exemplary relative altitude indicator for the geographic areas shown in FIG. 3.

A relative altitude indicator is displayed 225 via a presentation device (e.g., presentation device 125) for each geographic area based at least in part on the corresponding relative altitude. In some embodiments, a relative altitude indicator corresponding to an MSA below the current altitude is graphically distinguished from a relative altitude indicator corresponding to an MSA above the current altitude. FIG. 4 is an exemplary relative altitude indicator 400 for forward geographic area 330, rear geographic area 335, left-hand geographic area 340, right-hand geographic area 345, and center geographic area 355. Center geographic area 355 corresponds to a current position of the vehicle. Accordingly, a vehicle indicator 405 is displayed at the center of center geographic area 355.

Relative altitude indicator 400 facilitates indication of a relative altitude of a vehicle with respect to a plurality of directions. Relative altitude indicator 400 may be displayed via a dedicated display device, incorporated into a control interface providing additional features, such as a moving map, or a combination thereof. Furthermore, relative altitude indicator 400 may display a geographic area approximately corresponding to a geographic area displayed in a moving map. Relative altitude indicator 400 may be overlaid on a moving map (e.g., centered at a current position of the vehicle), offset from the moving map, or a combination thereof. In some embodiments, relative altitude indicator is displayed at a size of 1.5 inches or greater to facilitate ease of interpretation by an operator.

Center geographic area 355, right-hand geographic area 345, and rear geographic area 335 correspond to positive relative altitudes greater than the MCH. Forward geographic area 330 corresponds to a relative altitude approximately between zero and the MCH. Left-hand geographic area 340 corresponds to a relative altitude below zero. Stated differently, center geographic area 355, right-hand geographic area 345, and rear geographic area 335 correspond to MSAs below the current altitude by a margin approximately equal to or greater than the MCH, whereas left-hand geographic area 340 corresponds to an MSA above the current altitude.

Accordingly, left-hand geographic area 340 is displayed with a dark fill pattern, providing graphical distinction from center geographic area 355, right-hand geographic area 345, and rear geographic area 335, which are displayed with a light fill pattern. In addition, forward geographic area 330, which corresponds to an MSA below the current altitude by a margin approximately less than the MCH, is displayed in a medium shade pattern. FIG. 4 illustrates graphical distinction by applying a fill pattern. In addition, or alternatively, graphical distinction may be achieved by applying a color (e.g., a background color or a foreground color), a line pattern, a line weight, a typeface, a font weight, an animation (e.g., blinking), any other suitable means for distinguishing graphical elements from one another, or any combination thereof.

In some embodiments, a threat level is assigned 230 to each geographic area. A threat level represents a risk of contact between the vehicle and terrain or an obstruction within a geographic area. Threat levels may be expressed as a plurality of gradations (e.g., low, moderate, and high), a probability of contact (e.g., a percentage), any other means suitable for indicating a risk of contact between a vehicle and terrain or obstructions, or any combination thereof. The relative altitude indicator for a geographic area may be displayed 225 based at least in part on the assigned threat level. For example, one or more graphical attributes (e.g., a fill pattern, a color, a line weight, or an animation) of the relative altitude indicator may be defined based at least in part on a threat level. In an exemplary embodiment, a geographic area associated with a low threat level is displayed in green, a geographic area associated with a moderate threat level is displayed in yellow, and a geographic area associated with a high threat level is displayed in red.

Figure 5:
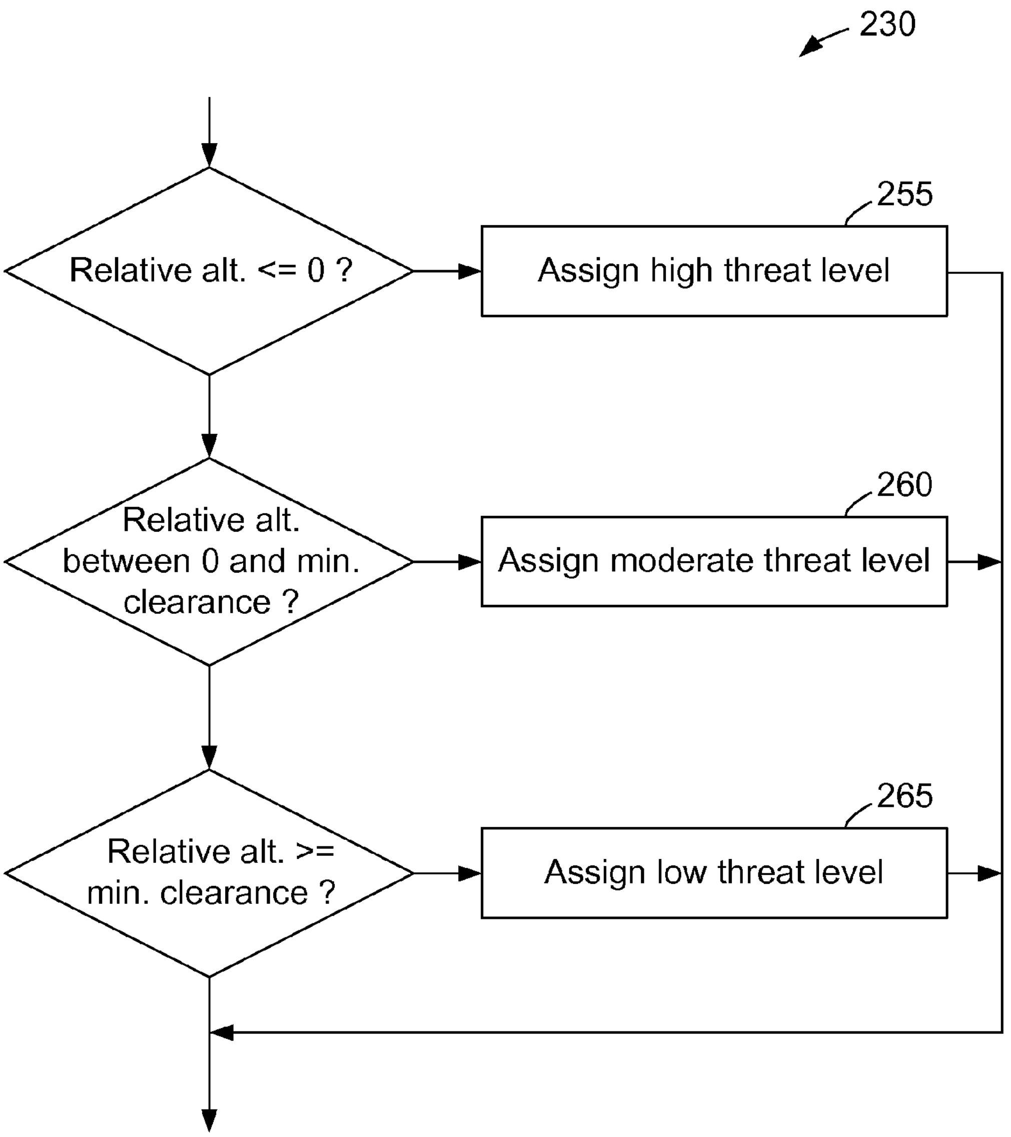
FIG. 5 is a flowchart illustrating an exemplary method for assigning a threat level to a geographic area.

FIG. 5 is a flowchart illustrating an exemplary method for assigning 230 a threat level to a geographic area based on a relative altitude and a minimum clearance height (MCH). In the example shown in FIG. 5, a geographic area may be assigned a low threat level, a moderate threat level, or a high threat level. A high threat level is assigned 255 if the relative altitude for the geographic area is less than zero or approximately equal to zero. A moderate threat level is assigned 260 if the relative altitude for the geographic area is approximately between zero and the MCH. A low threat level is assigned 265 if the relative altitude for the geographic area is approximately equal to or greater than the MCH.

Figure 6:
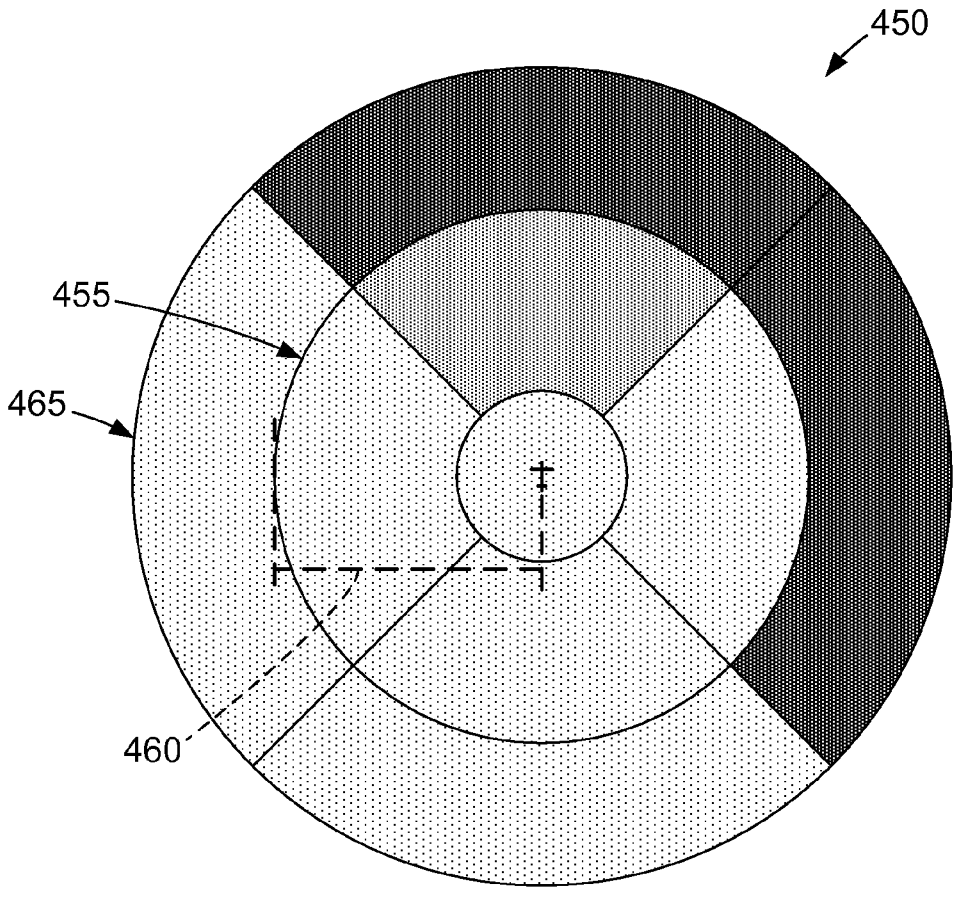
FIG. 6 is an exemplary relative altitude indicator for geographic areas within concentric annuli.

In some embodiments, geographic areas 305 are defined 210, at least in part, by defining a first geographic area substantially surrounding the vehicle and a plurality of second geographic areas substantially surrounding the first geographic area. FIG. 6 is an exemplary relative altitude indicator 450 for geographic areas within concentric annuli. Specifically, relative altitude indicator 450 includes an inner annulus 455, similar to annulus 310 shown in FIG. 3 and having an outer radius 460. Relative altitude indicator 450 also includes an outer annulus 465, which is defined as having a center approximately at the current geographic position. and an inner radius approximately equal to outer radius 460 of inner annulus 455. Such embodiments facilitate evaluating a safe direction of travel for both a near range represented by inner annulus 455 and a medium range represented by outer annulus 465. As used herein, the terms “approximately at” and “approximately equal to” mean that a value (e.g., a geographic position or a radius) is within a margin of tolerance of a second value. A margin of tolerance may be expressed as an absolute value (e.g., 1 meter, 3 meters, 10 meters, or 1 nautical mile) or as a relative value (e.g., 5%, 10%, or 20%). In some embodiments, a margin of tolerance is defined as a margin of measurement error corresponding to the value or values being evaluated. For example, a geographic position determined using the global positioning system (GPS) may have a margin of measurement error of approximately 5 meters.

Figure 7:
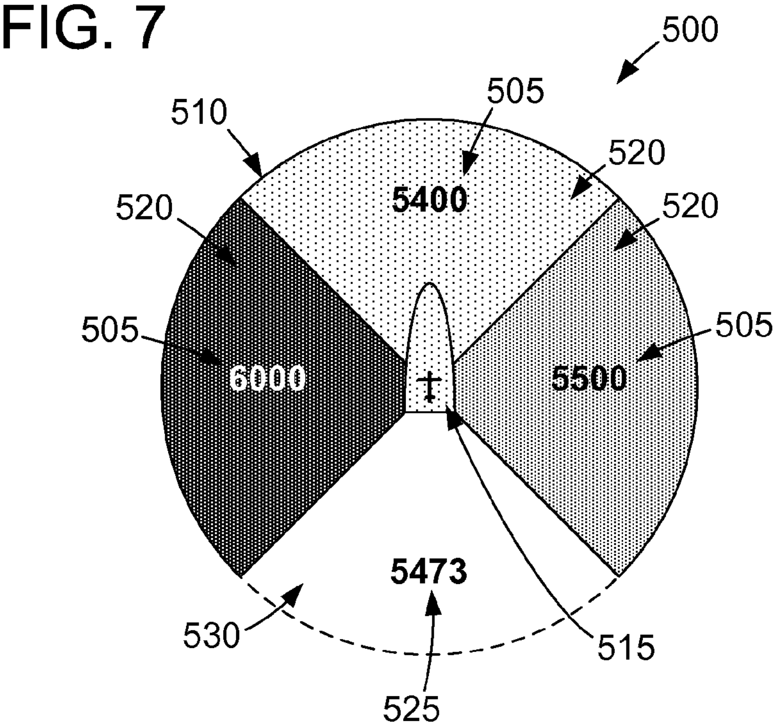
FIG. 7 is an exemplary relative altitude indicator including an ogival center geographic area and minimum safe altitude indicators.

FIG. 7 is an exemplary relative altitude indicator 500 including MSA indicators 505. Relative altitude indicator 500 is created by defining a circle 510 having a center approximately at the current geographic position, as shown in FIG. 3. A center geographic area 515, substantially surrounding the vehicle, is defined. Center geographic area 515 is displayed as an ogive (i.e., a bullet shape) but may have any suitable shape. A plurality of surrounding geographic areas 520 are defined as contiguous sectors, not including center geographic area 515, within the circle.

MSA indicators 505 provide a textual representation of the MSA corresponding to a surrounding geographic area 520. Alternatively, an MSA indicator 505 may be displayed for a subset of surrounding geographic areas 520. For example, an MSA indicator 505 may be displayed only for a surrounding geographic area 520 associated with a moderate or high threat level. In an exemplary embodiment, a current altitude indicator 525 is displayed in a rear geographic area 530, facilitating numeric comparison of a current altitude to one or more MSAs using a single display.

Figure 8:
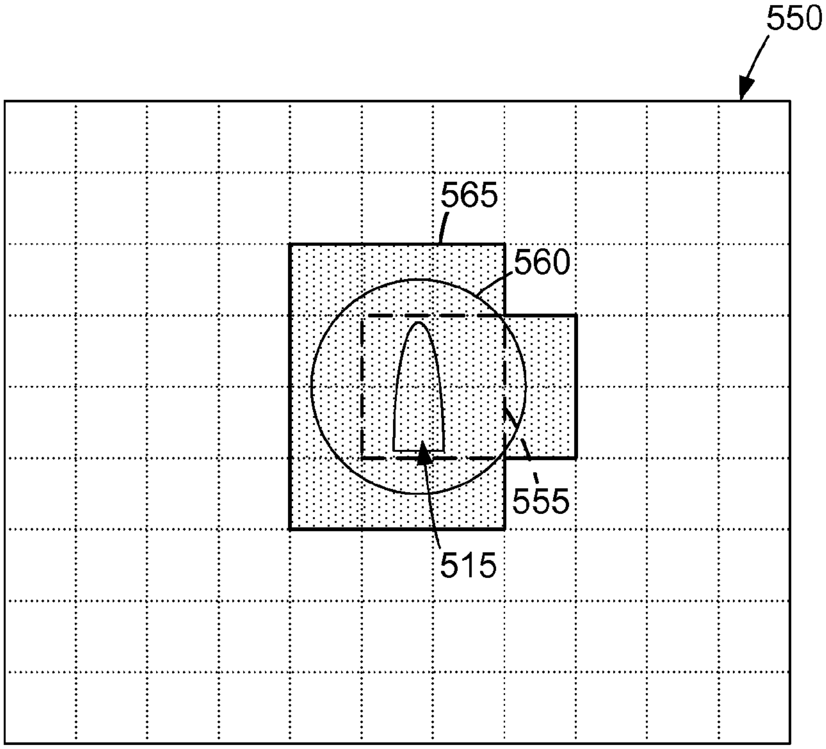
FIG. 8 is an illustration of the ogival center geographic area shown in FIG. 7 overlaid on a map and associated with an extended geographic area.

In some embodiments, a geographic area includes terrain points outside its corresponding displayed area. FIG. 8 is an illustration of center geographic area 515 overlaid on a map 550. Center geographic area 515 includes a first set of terrain points 555. Depending on its speed, the vehicle may quickly approach terrain not represented by first set of terrain points 555. An expanded geographic area 560 is defined for center geographic area 515 as a circle surrounding center geographic area 515. Expanded geographic area 560 includes a second set of terrain points 565. An MSA may be determined for center geographic area 515, as described above, using second set of terrain points 565 within expanded geographic area 560. Such an embodiment facilitates providing adequate warning of a low relative altitude with respect to nearby or approaching terrain.

While embodiments are described as using circles, annuli, and ogives to define geographic areas, the use of other shapes is also contemplated. For example, squares, rectangles, triangles, ellipses, ovals, and any other suitable geometric, curvilinear, or organic shape may be used with the methods and apparatus described herein. Furthermore, such shapes may be defined as contiguous, separate, or intersecting, and any quantity and extent of geographic areas suitable for use with the methods described herein may be defined.

The subject matter of the present disclosure is described with specificity herein to meet statutory requirements. However, the description itself is not intended to limit the scope of this patent. Rather, it has been contemplated that the claimed subject matter might also be embodied in other ways, to include different steps or combinations of steps similar to the ones described in this document, in conjunction with other present or future technologies. Moreover, although the terms “step,” “block,” or “operation” may be used herein to connote different elements of methods employed, the terms should not be interpreted as implying any particular order among or between various steps herein disclosed unless and except when the order of individual steps is explicitly described.

The methods described herein may be encoded as executable instructions embodied in a computer readable medium, including, without limitation, a storage device or a memory area of a computing device. Such instructions, when executed by a processor, cause the processor to perform at least a portion of the methods described herein.

This written description uses examples to disclose the described embodiments, including the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for indicating a relative altitude of a vehicle, the method comprising:

obtaining, from at least one navigation instrument, a current geographic position and a current altitude of the vehicle;

defining, by a processor, one or more geographic areas surrounding the current geographic position, the one or more geographic areas defining a plurality of contiguous sectors within an annulus having a center approximately at the current geographic position of the vehicle;

determining, by the processor, a minimum safe altitude (MSA) for each geographic area of the one or more geographic areas based at least in part on a minimum clearance height and at least one of the following: a maximum terrain elevation within the geographic area, and a maximum obstruction elevation within the geographic area;

determining, by the processor, a relative altitude for each geographic area of the one or more geographic areas, the relative altitude representing the current altitude of the vehicle relative to the MSA for the geographic area; and displaying, via a presentation device, a relative altitude indicator for each geographic area of the one or more geographic areas based at least in part on the corresponding relative altitude, wherein a relative altitude indicator corresponding to an MSA below the current altitude is graphically distinguished from a relative altitude indicator corresponding to an MSA above the current altitude.

2. The method of claim 1, wherein defining the one or more geographic areas further comprises defining a center area about the current geographic position.

3. The method of claim 1, wherein the annulus is an inner annulus, the method further comprising:

defining an outer annulus having a center approximately at the current geographic position and an inner radius approximately equal to an outer radius of the inner annulus, and wherein defining the one or more geographic areas further comprises defining a plurality of contiguous sectors within the outer annulus.

4. The method of claim 1, further comprising obtaining, from the at least one navigation instrument, a direction of travel, wherein defining the one or more geographic areas comprises defining:

a forward sector representing an area in the direction of travel;

a left-hand sector representing an area to the left of the direction of travel; and a right-hand sector representing an area to the right of the direction of travel.

5. The method of claim 1, further comprising:

assigning a threat level to each geographic area of the one or more geographic areas based at least in part on the relative altitude, wherein displaying a relative altitude indicator for each geographic area of the one or more geographic areas based at least in part on the corresponding relative altitude comprises defining a graphical attribute of the relative altitude indicator based at least in part on the threat level assigned to the corresponding geographic area.

6. The method of claim 5, wherein assigning a threat level to a geographic area comprises:

assigning a high threat level if the relative altitude for the geographic area is negative or approximately equal to zero;

assigning a moderate threat level if the relative altitude for the geographic area is positive and less than or approximately equal to the minimum clearance height; and assigning a low threat level if the relative altitude for the geographic area is positive and greater than the minimum clearance height.

7. The method of claim 1, further comprising:

determining a climb capability of the vehicle; and determining the MSA for each geographic area of the one or more geographic areas based further on the climb capability of the vehicle, wherein the climb capability is based at least in part on at least one of the following: a current speed of the vehicle and an environmental condition.

8. A system for indicating a condition of a vehicle, said system comprising:

at least one navigation instrument configured to provide a current geographic position and a current altitude of the vehicle;

a computing device coupled in communication with the at least one navigation instrument and configured to:

define a plurality of geographic areas adjacent to the current geographic position, each of the geographic areas corresponding to a plurality of terrain points;

define a plurality of contiguous sectors by the plurality of geographic areas, the plurality of contiguous sectors within an annulus having a center approximately at the current geographic position of the vehicle;

determine a minimum safe altitude (MSA) for each geographic area of the plurality of geographic areas based at least in part on a maximum elevation of the corresponding terrain points and a minimum clearance height; and assign a threat level to each geographic area of the plurality of geographic areas based at least in part on the MSA and the current altitude; and a presentation device coupled in communication with the processor and configured to display a graphical representation of the threat level assigned to each geographic area.

9. The system of claim 8, wherein the at least one navigation instrument is further configured to provide a current heading of the vehicle, and the computing device is configured to define the plurality of geographic areas based further on the current heading of the vehicle.

10. The system of claim 8, wherein the computing device is configured to determine the maximum elevation of the corresponding terrain points for each geographic area by determining at least one of the following: a maximum terrain elevation associated with the corresponding terrain points and a maximum obstruction elevation associated with the corresponding terrain points.

11. The system of claim 8, wherein the computing device is configured to define the plurality of geographic areas by defining a first geographic area surrounding the vehicle and a plurality of second geographic areas substantially surrounding the first geographic area.

12. The system of claim 11, wherein the computing device is configured to define the plurality of second geographic areas by:

defining a circle having a center approximately at the current geographic position; and defining a plurality of outer contiguous sectors within the circle, the outer contiguous sectors not including the first geographic area.

13. The system of claim 8, wherein the computing device is configured to assign a threat level to each geographic area of the plurality of geographic areas by:

assigning a high threat level to the geographic area if the current altitude of the vehicle is approximately equal to or below the maximum altitude of the geographic area;

assigning a moderate threat level to the geographic area if a difference between the current altitude of the vehicle and the maximum altitude of the geographic area is approximately between zero and the minimum clearance height; and assigning a low threat level to the geographic area if the difference between the current altitude of the vehicle and the maximum altitude of the geographic area is approximately greater than the minimum clearance height.

14. The system of claim 8, further comprising an environmental instrument coupled in communication with the computing device and configured to provide an environmental condition, wherein the computing device is further configured to:

determine a climb capability of the vehicle based at least in part on the environmental condition; and determine the MSA for each geographic area of the plurality of geographic areas based further on the climb capability of the vehicle.

15. The system of claim 8, further comprising a vehicle instrument coupled in communication with the computing device and configured to provide a vehicle condition, wherein the computing device is further configured to:

determine a climb capability of the vehicle based at least in part on the vehicle condition; and determine the MSA for each geographic area of the plurality of geographic areas based further on the climb capability of the vehicle.

16. A device for indicating a relative altitude of a vehicle, the device comprising:

an instrument interface configured to receive a current geographic position and a current altitude from at least one navigation instrument;

a processor coupled in communication with the instrument interface and programmed to:

define a plurality of geographic areas proximate to the vehicle based at least in part on the current geographic position, the plurality of geographic areas comprising a plurality of contiguous sectors approximately within a radial distance of the vehicle and corresponding to a plurality of terrain points, the plurality of contiguous sectors defined within an annulus having a center approximately at the current geographic position of the vehicle;

determine a minimum safe altitude (MSA) for each geographic area of the plurality of geographic areas based at least in part on a maximum elevation of the corresponding terrain points and a minimum clearance height; and assign a threat level to each geographic area of the plurality of geographic areas based at least in part on the MSA and the current altitude; and a presentation device coupled in communication with the processor and configured to display a graphical representation of each geographic area of the plurality of geographic areas based on the threat level assigned to the geographic area.

17. The device of claim 16, wherein the processor is programmed to define the plurality of contiguous sectors within the annulus by defining a forward sector corresponding to a current heading, a left-hand sector corresponding to a direction approximately ninety degrees less than the current heading, and a right-hand sector corresponding to a direction approximately ninety degrees greater than the current heading.

18. The device of claim 16, wherein the instrument interface is further configured to receive a current speed from the at least one navigation instrument, and the processor is further programmed to determine the radial distance based at least in part on the current speed.

19. The device of claim 16, wherein the presentation device is further configured to display a textual representation of the corresponding MSA within the graphical representation of at least one geographic area.

* * * * *